United States Patent [19]

Gatte

[11] Patent Number: 5,236,877
[45] Date of Patent: Aug. 17, 1993

[54] DUAL ZEOLITE FLUID CRACKING CATALYST COMPOSITION FOR IMPROVED GASOLINE OCTANE

[75] Inventor: Robert R. Gatte, Columbia, Md.

[73] Assignee: W. R. Grace & Co.-Conn., New York, N.Y.

[21] Appl. No.: 818,482

[22] Filed: Jan. 7, 1992

Related U.S. Application Data

[63] Continuation of Ser. No. 624,382, Dec. 4, 1990, abandoned.

[51] Int. Cl.$^5$ .............................................. B01J 29/06
[52] U.S. Cl. ......................................................... 502/67
[58] Field of Search ............................................ 502/67

[56] References Cited

U.S. PATENT DOCUMENTS

| | | | |
|---|---|---|---|
| 3,140,249 | 6/1954 | Plank et al. | 208/120 |
| 3,352,796 | 11/1967 | Kimberlin et al. | 502/66 |
| 3,647,718 | 3/1972 | Haden et al. | 502/68 |
| 3,758,403 | 9/1973 | Rosinski et al. | 208/120 |
| 3,864,283 | 2/1975 | Schutt | 502/67 |
| 3,894,931 | 7/1975 | Nace et al. | 208/73 |
| 3,894,933 | 7/1975 | Owen et al. | 208/77 |
| 3,923,639 | 12/1975 | Ciric | 208/111 |
| 4,021,447 | 5/1977 | Rubin et al. | 423/328 |
| 4,137,152 | 1/1979 | Chester et al. | 208/120 |
| 4,241,036 | 12/1980 | Flanigen et al. | 423/328 |
| 4,289,606 | 7/1981 | Gladrow et al. | 208/120 |
| 4,309,279 | 1/1982 | Chester et al. | 208/120 |
| 4,309,280 | 1/1982 | Rosinski et al. | 208/120 |
| 4,331,643 | 5/1982 | Rubin et al. | 423/329 |
| 4,340,465 | 7/1982 | Miller et al. | 208/120 |
| 4,368,114 | 1/1983 | Chester et al. | 208/120 |
| 4,493,902 | 1/1985 | Brown et al. | 502/65 |
| 4,503,023 | 3/1985 | Breck | 502/85 |
| 4,581,341 | 4/1986 | Himpal | 502/68 |
| 4,724,967 | 2/1988 | Raatz et al. | 208/120 |
| 4,740,292 | 4/1988 | Chen et al. | 208/120 |
| 4,780,436 | 10/1988 | Raatz et al. | 502/66 |
| 4,840,779 | 6/1989 | Cannan | 423/328 |
| 4,925,546 | 5/1990 | Kukes et al. | 502/67 |
| 4,992,400 | 2/1991 | Marcilly et al. | 502/67 |

FOREIGN PATENT DOCUMENTS

| | | |
|---|---|---|
| 0020154 | 5/1980 | European Pat. Off. |
| 0229609 | 1/1987 | European Pat. Off. |
| 0273403 | 6/1988 | European Pat. Off. |
| 0350331 | 10/1990 | European Pat. Off. |
| 1117568 | 6/1968 | United Kingdom . |
| 1297256 | 11/1972 | United Kingdom . |
| 2175890 | 12/1986 | United Kingdom . |
| 8700158 | 1/1987 | World Int. Prop. O. |

OTHER PUBLICATIONS

"The Synthesis, Characterization, and Catalytic Activity of Omega and ZSM-4 Zeolites", A. J. Perrotta et al, Journal of Catalysis (1978) pp. 240-249.

*Primary Examiner*—Carl F. Dees
*Attorney, Agent, or Firm*—Edward J. Cabic

[57] ABSTRACT

Hydrocarbon conversion catalyst compositions which are highly selective for producing gasoline-range olefins, aromatics and, hence, a high octane gasoline, by making a combination catalyst of two different zeolites. The combination of a stabilized zeolite Omega component and a zeolite Y component produces a catalyst which is highly selective for the production of gasoline-range olefins and aromatics. The two components can be added separately to an FCC process or they can be matrixed together.

12 Claims, No Drawings bonds# DUAL ZEOLITE FLUID CRACKING CATALYST COMPOSITION FOR IMPROVED GASOLINE OCTANE This is a continuation of application Ser. No. 624,382, filed Dec. 4, 1990 and now abandoned.

BACKGROUND OF THE INVENTION

1. Field of the Invention

This invention relates to catalysts for fluid catalytic cracking which produce high octane gasoline and increase light (C3 and C4) olefin yields, while minimizing the gasoline yield loss typically associated with octane additive systems. The catalysts employed are composed of a mixture of zeolite Omega (ZSM-4) and a Y zeolite in a conventional catalyst matrix.

2. Description of Previously Published Art

For many years, cracking catalysts employing some form of faujasite type Y zeolite have been used to produce high octane gasoline in the fluid catalytic cracking (FCC) process. Catalysts employing said zeolite in a matrix are disclosed in U.S. Pat. Nos. 3,140,249, 3,352,796, 3,647,718, 4,581,341 and 4,493,902. Recently, several disclosures have appeared which use mixtures of zeolite Y with other components to improve the octane of the resulting gasoline-range product. U.S. Pat. Nos. 3,758,403, 3,894,931, 3,894,933, 4,289,606, 4,309,279, 4,309,280 and 4,368,114 disclose the use of zeolite Y admixed with zeolite ZSM-5 in the FCC catalyst particle or the use of a mixture of two FCC catalysts, one a conventional cracking catalyst using Y and the other using ZSM-5, or the use of a conventional FCC catalyst with finely powdered ZSM-5 added to the charge stock to make higher octane gasoline. U.S. Pat. No. 4,340,465 discloses the use of a FCC catalyst employing a mixture of Silicalite and rare-earth-exchanged Y to make a higher octane gasoline. U.S. Pat. No. 4,137,152 discloses the use of catalysts composed of a mixture of Y and Mordenite. U.S. Pat. No. 4,740,292 discloses the use of catalysts composed of a mixture of zeolite Beta with a conventional zeolite Y cracking catalyst and European Patent No. 350,331 discloses the use of mixtures of zeolite L with zeolite Y catalysts, both for improved gasoline octane. However, in all cases there is a gasoline yield penalty associated with the production of high-octane gasoline.

The synthesis and composition-of-matter of zeolite Omega (also known as ZSM-4 and LZ-202), the synthetic counterpart of the natural mineral Mazzite, has been described in several patents (U.S. Pat. Nos. 3,923,639, 4,021,447, 4,241,036, 4,331,643, 4,840,779, U.K. Patents 1,117,568, 1,297,256, 2,175,890, European Patent 273,403 and World Patent 87/00158) and in numerous articles in the open literature, including Perrotta, et al, *Journal of Catalysis*, Vol. 55, pages 240–249 (1978).

The stabilization procedure used for the Omega zeolite of the present invention is one commonly applied to zeolite materials, utilizing ammonium exchanges, hydrothermal treatment and acid extraction. Its application to zeolite Omega is described in U.S. Pat. Nos. 4,724,067 and 4,780,436. An alternate approach to stabilization is presented in U.S. Pat. No. 4,503,023 and involves treatment with ammonium hexafluorosilicate to selectively replace framework aluminum with silicon, thus stabilizing the structure.

The use of a catalyst comprising a mixture of an Omega zeolite with a Y-type zeolite is disclosed in U.S. Pat. No. 3,864,283, while the use of zeolite Omega as a catalyst for FCC has been described in U.S. Pat. No. 4,724,067. However, no claims are made concerning the use of stabilized zeolite Omega in conjunction with a Y zeolite as a catalyst for production of improved-octane gasoline.

3. Objects of the Invention

It is an object of this invention to use a stabilized zeolite Omega as an effective catalyst or additive to increase the octane of FCC gasoline which is produced without the use of external hydrogen pressure.

It is further an object of this invention to produce and use a dual catalyst which is a combination of a stabilized zeolite Omega and a Y zeolite for increasing the octane of FCC gasoline as well as increasing the olefinicity of the light gas product.

It is further an object of this invention to produce and use a composite catalyst consisting of a stabilized zeolite Omega, a Y zeolite (rare-earth exchanged and/or ultrastabilized), a matrix and a binder as a very effective catalyst or additive for increasing the octane of FCC gasoline as well as increasing the olefinicity of the light gas product.

These and further objects will become apparent as the description of the invention proceeds.

SUMMARY OF THE INVENTION

Hydrocarbon conversion catalyst compositions are made which are highly selective for producing gasoline-range olefins, aromatics and, hence, a high octane gasoline, by making a combination catalyst of two different zeolites. For example, the combination of stabilized zeolite Omega component and a zeolite Y component produces a catalyst which is highly selective for the production of gasoline-range olefins and aromatics the fluid cracking catalyst does not have a hydrogenation component. The two components can be added separately to an FCC process or they can be matrixed together.

DESCRIPTION OF THE PREFERRED EMBODIMENTS

The catalysts of the present invention can be prepared by making composites containing two different zeolite materials. The catalysts are composed of 5 to 80 wt % zeolitic material in an inorganic oxide matrix. The zeolite component of the catalyst consists of a mixture of a Y zeolite, which may be ultrastabilized (USY), exchanged with rare-earth cations (REY) or both (REUSY), and a stabilized Omega (ZSM-4) zeolite. The weight ratio of the Y-type zeolite to the Omega zeolite in this dual-zeolite mixture can vary from 1:3 to 20:1.

In one preferred embodiment, the Omega zeolite may be stabilized using standard procedures, which involve ammonium exchange to remove sodium cations, steam dealumination and stabilization, and acid extraction to remove any non-framework alumina debris. Alternate methods of stabilization include the use of ammonium hexafluorosilicate or silicon tetrachloride to dealuminate and stabilize the omega zeolite structure. Stabilization is a necessary part of the present invention, since non-stabilized Omega zeolite will be quickly deactivated and destroyed in the regenerator associated with the FCC unit.

Procedures for stabilizing zeolite Omega are described in U.S. Pat. Nos. 4,724,067 and 4,780,436. An alternate approach to stabilization is presented in U.S. Pat. No. 4,503,023 and involves treatment with ammonium hexafluorosilicate to selectively replace framework aluminum with silicon, thus stabilizing the structure.

In general, when zeolite Omega is synthesized it is formed with a silica to alumina ratio of about 6:1. As indicated above, using such a material would not be effective in an FCC unit since it will be quickly deactivated and destroyed during regeneration. By subjecting the zeolite Omega to the stabilization treatment, the silica to alumina ratio is increased to a value generally greater than 15. This higher silica content zeolite is then able to withstand the sever conditions in the FCC unit.

Zeolites are usually mixed with binders, fillers and functional additives to provide a composite catalyst. The term matrix refers to the non-zeolitic ingredients in the catalyst. A variety of matrix components have been disclosed in the prior art. These include silica, alumina, silica-alumina, clay, silica-zirconia, silica-magnesia and mixtures thereof. Methods of preparation of these matrix components have also been disclosed in the prior art. Matrix components chosen from among all of these disclosed inorganic oxide materials are contemplated for the dual zeolite catalyst of the present invention.

The composite zeolite catalyst of the present invention is useful in fluid catalytic cracking by providing high selectivity for gasoline range olefins and aromatics resulting in high octane gasoline, as well as high selectivity for light olefins resulting in a more olefinic LPG product. By preferably blending a stabilized Omega zeolite with a Y zeolite in a weight ratio of 3:1 to 1:20 to form a composite catalyst containing 5 to 80 wt % total zeolite in an inorganic matrix it is possible to lower gasoline paraffinicity and increase olefinicity and aromaticity relative to the Y-only catalyst so as to produce high octane gasoline. The catalysts so described do not suffer from the gasoline yield loss typically associated with previous dual-zeolite octane additive systems.

The preferred weight range of the Y-type zeolite to the stabilized Omega zeolite is 1:3 to 20:1 with a more preferred range being 1:1 to 4:1. In the composite catalyst embodiment the total zeolite content is from 5 to 80 wt % with a more preferred range being 30 to 60%. For an FCC catalyst the particles are preferable below 200 microns and more preferably in the rang of 10 to 150 microns.

The catalytic cracking process is conducted under cracking conditions in the absence of added hydrogen. Preferred temperatures are in the range of 400 to 700° C. and pressures are in the range of 0 to 5 atmospheres.

Gasoline composition is typically determined using standard chromatographic techniques. The composition can be broken down in terms of carbon number and hydrocarbon type (normal paraffin, isoparaffin, olefin, naphthene or aromatic) and this information used to calculate gasoline octane number as described by Cotterman and Plumlee, Prepr. Am. Chem. Soc., Div. Petr. Chem., 34(4), 756 (1989).

Having described the basic aspects of our invention, the following examples, while not exhaustive, are presented as illustrations of the specific embodiments thereof.

EXAMPLE 1

This example describes the preparation of composite catalysts.

Two catalysts were formulated from 25% by weight of a dealuminated and stabilized zeolite Omega (ZSM-4), 25% by weight of an ultrastabilized Y zeolite (USY) or partially rare-earth-exchanged ultrastabilized Y zeolite (REUSY, 4 wt % $RE_2O_3$), 30% by weight of a kaolin clay and 20% by weight of a colloidal silica as a binder. The catalysts were hydrothermally treated for 4 hours at either 1400° F. or 1500° F. in 95% steam. The catalysts were designated as follows.

A: Omega/USY, steamed at 1400° F.;
B: Omega/USY, steamed at 1500° F.;
C: Omega/REUSY, steamed at 1400° F.; and
D: Omega/REUSY, steamed at 1500° F.

EXAMPLE 2

This example describes the catalytic testing of the composite catalysts described in Example 1.

The catalysts were tested for gas oil cracking activity and selectivity using an ASTM microactivity test. The feed was a sour import heavy gas oil (SIHGO) and reactions were run at 980° F. As a reference material, Octacat ®, a USY-based catalyst produced by Davison Chemical Company was also tested. The results of the cracking experiments are presented in Table 1.

TABLE 1

| MAT Data for Omega/Y Formulated Catalysts Described in Example Two | | | | |
|---|---|---|---|---|
| Test Conditions: SIHGO Feed, 980° F., 1 atm | | | | |
| Catalyst | Octacat ® | A | C | D |
| Conversion, wt % | 60.0 | 60.0 | 60.0 | 60.0 |
| Product Yields, wt % | | | | |
| Light Gas (C1–C4) | 15.9 | 16.4 | 15.6 | 15.1 |
| Gasoline (C5–C12) | 42.0 | 39.7 | 41.1 | 41.4 |
| LCO | 24.1 | 23.1 | 23.8 | 24.2 |
| Bottoms | 15.9 | 16.9 | 16.1 | 15.8 |
| Coke | 1.7 | 3.5 | 3.0 | 3.2 |
| Gasoline Composition, wt % | | | | |
| P | 4.7 | 4.0 | 4.1 | 4.1 |
| I | 31.8 | 34.4 | 34.1 | 33.9 |
| O | 23.2 | 20.3 | 21.6 | 21.6 |
| N | 8.5 | 7.8 | 8.4 | 8.8 |
| A | 31.8 | 33.5 | 31.8 | 32.6 |
| Calculated Octane Number | | | | |
| RON | 90.8 | 91.6 | 90.9 | 90.8 |
| MON | 80.3 | 81.3 | 80.7 | 80.6 |

From Table 1 the Omega-containing catalysts produce a gasoline-range product with increased isoparaffins (I) and decreased n-paraffins (P) and olefins (O) relative to the Octacat ® reference catalyst. The Omega/USY catalyst (sample A) also shows an increase in the aromatic (A) content of the gasoline-range product. Omega-containing catalysts produce octane number (MON and RON) increases relative to the reference as a result of this shift in product distribution. The effect is most apparent for the Omega/USY catalyst (sample A), which shows a +1 number boost in both RON and MON. Octane increases are accompanied by a slight loss (less than 1 to 2 percent, absolute) in gasoline yield. This loss is significantly less than the losses associated with the use of other octane-enhancing additives such as ZSM-5. U.S. Pat. Nos. 4,289,606, 4,309,279 and 4,368,114 all demonstrate the FCC gasoline yield loss associated with the use of ZSM-5 as an octane additive.

EXAMPLE 3

This example further illustrates the advantages of the catalysts according to the present invention.

Three catalysts were formulated to contain 40% by weight zeolite, 40% by weight kaolin clay and 20% by weight colloidal silica as a binder. The zeolite component composition was altered so that the three materials contained 0, 25 and 50 percent by weight Omega zeolite with the balance being an ultrastabilized Y (USY) zeolite. The three catalysts were treated hydrothermally at 1500° F., 4 hrs, 95% steam prior to testing via gas oil cracking as described in Example 2. The results of the cracking experiments are shown in Table 2.

TABLE 2

MAT Data for Omega/USY Catalysts
Test Conditions: SIHGO Feed, 980° F., 1 atm

| Catalyst | 100 USY | 27/75 Omega/USY | 50/50 Omega/USY |
|---|---|---|---|
| WHSV, hr$^{-1}$ | 37.5 | 30.8 | 23.5 |
| Catalyst/Oil | 3.2 | 3.9 | 5.1 |
| Conversion, wt % | 66 | 66 | 66 |
| Product Yields, wt % | | | |
| Light Gas (C1–C4) | 18.0 | 17.5 | 18.7 |
| Gasoline (C5–C12) | 44.7 | 45.5 | 43.9 |
| LCO | 21.0 | 21.0 | 21.0 |
| Bottoms | 13.3 | 13.3 | 13.3 |
| Coke | 3.0 | 2.7 | 3.1 |
| Gasoline Composition, wt % | | | |
| P | 4.3 | 4.2 | 3.9 |
| I | 40.3 | 37.2 | 34.6 |
| O | 16.1 | 17.5 | 18.1 |
| N | 8.4 | 8.7 | 7.5 |
| A | 30.9 | 32.4 | 35.9 |
| Light Gas Yields, wt % | | | |
| $H_2$ | 0.06 | 0.06 | 0.11 |
| $C_1 + C_2$ | 2.0 | 2.0 | 2.0 |
| $NC_3$ | 1.2 | 1.0 | 1.1 |
| $C_3=$ | 4.9 | 4.9 | 5.2 |
| $NC_4$ | 0.8 | 0.7 | 0.7 |
| $i$-$C_4$ | 4.2 | 3.8 | 3.9 |
| $C_4=$ | 4.8 | 5.1 | 5.7 |
| Calculated Octane Number | | | |
| RON | 89.8 | 90.6 | 91.8 |
| MON | 80.8 | 81.0 | 81.7 |

From Table 2:

(1) The product yields (light gas, gasoline, LCO, HCO, coke) vary by less than 1 wt % absolute for the three catalysts. It is significant to note that there is no coke increase for the catalysts containing Omega zeolite.

(2) Addition of Omega zeolite to USY alters the gasoline composition, increasing the olefin (O) and aromatic (A) content while decreasing the isoparaffin (I) content. This shift in composition boosts the gasoline octane.

(3) Addition of Omega zeolite to USY also alters the light gas composition, increasing the yields of C3 and C4 olefins while decreasing the yields of C3 and C4 paraffins.

These results clearly demonstrate the advantages of the present invention: improved gasoline octane and increased gasoline olefinicity with minimal loss of gasoline yield and no coke or dry gas increase. As such, they represent a significant improvement over current FCC catalyst technology.

EXAMPLE 4

This is a comparative example using Zeolite Omega alone to further demonstrate the advantages of the dual-zeolite system according to the present invention.

A catalyst was prepared from 40% by weight of Omega zeolite, 40% by weight of kaolin clay and 20% by weight of silica binder. This catalyst sample was hydrothermally treated at 1400° F., 4 hrs, 95% steam prior to being tested via gas oil cracking as described in Example 2 above. A sample of Octacat ® was used as a reference catalyst. The results of the cracking experiments are presented in Table 3.

TABLE 3

MAT Data for Omega Zeolite Catalysts
Test Conditions: SIHGO Feed, 980° F., 1 atm

| Catalyst | Octacat | Omega |
|---|---|---|
| WHSV, hr$^{-1}$ | 40 | 20 |
| Catalyst/Oil | 3 | 6 |
| Conversion, wt % | 49.2 | 48.3 |
| Product Yields, wt % | | |
| Light Gas (C1–C4) | 11.1 | 15.4 |
| Gasoline (C5–C12) | 37.1 | 29.7 |
| LCO | 27.2 | 24.4 |
| Bottoms | 23.6 | 27.3 |
| Coke | 1.0 | 3.2 |
| Light Gas Yields, wt % | | |
| $H_2$ | 0.04 | 0.09 |
| $C_1 + C_2$ | 0.37 | 0.95 |
| $NC_3$ | 0.50 | 1.4 |
| $C_3=$ | 3.1 | 3.6 |
| $NC_4$ | 0.4 | 0.6 |
| $iC_4$ | 1.5 | 1.7 |
| $C_4=$ | 4.4 | 4.8 |
| Gasoline Composition, wt % | | |
| P | 5.0 | 4.6 |
| I | 27.6 | 23.1 |
| O | 30.7 | 38.4 |
| N | 10.3 | 9.8 |
| A | 26.4 | 24.2 |
| Calculated Octane Number | | |
| RON | 91.1 | 93.5 |
| MON | 79.4 | 80.3 |

The data shows that the Omega catalyst increases the octane of the gasoline product as did the dual-zeolite catalysts. However, this octane boost is accompanied by a loss of over 7 wt % of the gasoline product, and an tripling of the coke yield. This clearly demonstrates the advantages of the dual-zeolite catalysts, which significantly improve the octane of FCC gasoline without a substantial loss in gasoline yield.

It is understood that the foregoing detailed description is given merely by way of illustration and that many variations may be made therein without departing from the spirit of this invention.

What is claimed is:

1. A fluid cracking catalyst useful for the production of high octane gasoline comprising a hydrothermally or chemically stabilized Y zeolite component and a stabilized Omega zeolite component having a silica to alumina ratio greater than 15 wherein the weight ratio of the Y zeolite to the stabilized Omega zeolite is 1:3 to 20:1, said catalyst not having a hydrogenation component.

2. A fluid cracking catalyst according to claim 1, wherein the fluid cracking catalyst comprises either
   a) a composite of a Y zeolite and a stabilized Omega zeolite in an inorganic matrix, or
   b) a mixture of a matrixed Y zeolite component and a matrixed stabilized Omega zeolite component.

3. A fluid cracking catalyst according to claim 2, wherein the catalyst comprises a composite of a Y zeolite and a stabilized Omega zeolite in an inorganic matrix.

4. A fluid cracking catalyst according to claim 3, wherein the zeolite Y component is present in an amount from 1 to 75 wt % of the catalyst particle and the stabilized Omega zeolite component is present in an amount from 1 to 60 wt % of the catalyst particle.

5. A fluid cracking catalyst according to claim 4, wherein the zeolite Y component is present in an amount from 5 to 40 wt % of the catalyst particle and the stabilized Omega zeolite component is present in an amount from 2 to 25 wt % of the catalyst particle.

6. A fluid cracking catalyst according to claim 1, wherein the Y zeolite has been exchanged with cations selected from the group consisting of $NH_4^+$, $La^{3+}$, $Ce^{3+}$, $Ce^{4+}$, $Nd^{3+}$, $Pr^{3+}$, $Pr^{4+}$, $Sm^{2+}$, $Mg^{2+}$, $Al^{3+}$, $P^{5+}$, $H^+$ and mixtures thereof.

7. A fluid cracking catalyst according to claim 1, wherein the Omega zeolite has been hydrothermally or chemically stabilized.

8. A fluid cracking catalyst according to claim 7, wherein the chemical reagents used for the chemical stabilization are $SiCl_4$ or $(NH_4)_2SiF_6$.

9. A fluid cracking catalyst according to claim 2, wherein the inorganic oxide matrix is selected from the group of silica, alumina, silica-alumina, silica-zirconia, silica-magnesia, clay and mixtures thereof.

10. A fluid cracking catalyst according to claim 2, in which the cracking catalyst comprises the Y zeolite component and the stabilized Omega component as separately matrixed components of a mixture.

11. A fluid cracking catalyst according to claim 1, wherein the weight ratio of the Y zeolite to the stabilized Omega zeolite is 1:1 to 4:1.

12. A fluid cracking catalyst according to claim 1, wherein the catalyst particle size is less than 200 microns.

* * * * *